United States Patent
Colakoglu

(10) Patent No.: US 9,939,886 B2
(45) Date of Patent: Apr. 10, 2018

(54) DATA COMMUNICATION METHOD VIA TOUCH SURFACE

(76) Inventor: Osman Colakoglu, Istanbul (TR)

( * ) Notice: Subject to any disclaimer, the term of this patent is extended or adjusted under 35 U.S.C. 154(b) by 22 days.

(21) Appl. No.: 14/122,053

(22) PCT Filed: May 24, 2012

(86) PCT No.: PCT/TR2012/000077
§ 371 (c)(1),
(2), (4) Date: Apr. 25, 2014

(87) PCT Pub. No.: WO2012/169981
PCT Pub. Date: Dec. 13, 2012

(65) Prior Publication Data
US 2014/0285421 A1    Sep. 25, 2014

(30) Foreign Application Priority Data
May 24, 2011    (TR) .................. 2011/05036

(51) Int. Cl.
*H04N 1/00* (2006.01)
*G06F 3/00* (2006.01)
*G06F 3/044* (2006.01)

(52) U.S. Cl.
CPC ............. *G06F 3/002* (2013.01); *G06F 3/044* (2013.01); *H04N 1/00129* (2013.01); *H04N 1/00347* (2013.01); *H04N 2201/006* (2013.01); *H04N 2201/0048* (2013.01); *H04N 2201/0053* (2013.01); *H04N 2201/0084* (2013.01); *H04N 2201/0087* (2013.01); *H04N 2201/0089* (2013.01)

(58) Field of Classification Search
CPC ..... G06F 3/002; G06F 3/044; H04N 1/00129; H04N 1/00347; H04N 2201/0048; H04N 2201/006; H04N 2201/0053; H04N 2201/0084; H04N 2201/0089; H04N 2201/0087; H04B 10/116; H04B 10/114; H04B 10/1141; H04B 10/1143
See application file for complete search history.

(56) References Cited

U.S. PATENT DOCUMENTS

| | | | |
|---|---|---|---|
| 2008/0044188 A1* | 2/2008 | Kagawa et al. | 398/128 |
| 2008/0253766 A1* | 10/2008 | Yu et al. | 398/41 |
| 2009/0251339 A1* | 10/2009 | Naruse | G06F 1/1626 341/33 |
| 2010/0209105 A1* | 8/2010 | Shin et al. | 398/58 |

(Continued)

FOREIGN PATENT DOCUMENTS

| | | |
|---|---|---|
| EP | 1237333 A1 | 9/2002 |
| JP | 2009044532 A | 2/2009 |
| WO | 2007017848 A2 | 2/2007 |

OTHER PUBLICATIONS

International Search Report for corresponding International Application No. PCT/TR2012/000077.

*Primary Examiner* — Bryan Earles
(74) *Attorney, Agent, or Firm* — Egbert Law Offices, PLLC

(57) ABSTRACT

A data communication method enabling wireless sharing of files or data between electronic devices that can store information and/or generate information by means of touch surface (capacitive or multi-touch), display units (LCD, led, etc.), photo sensor and frame having negative electrical conductivity.

4 Claims, 3 Drawing Sheets

(56) References Cited

U.S. PATENT DOCUMENTS

| | | | |
|---|---|---|---|
| 2010/0267421 A1* | 10/2010 | Rofougaran | G06F 3/044 |
| | | | 455/566 |
| 2011/0026917 A1* | 2/2011 | Li et al. | 398/1 |
| 2011/0069951 A1* | 3/2011 | Son et al. | 398/17 |
| 2011/0261269 A1* | 10/2011 | Khan | 348/734 |
| 2011/0284632 A1* | 11/2011 | Mullen | G06Q 20/352 |
| | | | 235/380 |
| 2012/0139865 A1* | 6/2012 | Krah et al. | 345/174 |
| 2012/0268414 A1* | 10/2012 | Alameh et al. | 345/174 |

* cited by examiner

DATA COMMUNICATION METHOD VIA TOUCH SURFACE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to the method enabling wireless sharing of files or data via touch surface between electronic devices that can store information and/or generate information.

2. Description of Related Art Including Information Disclosed Under 37 CFR 1.97 and 37 CFR 1.98.

There are two methods, wired and wireless, of data sharing between electronic devices. In the data transmission via cables, there are adverse circumstances such as the possibility of the cables being lost; not available to the user; not compatible with the device such as computers, etc. to which the data will be transmitted. Another problem is the failure to establish data transmission when the cable is deformed.

Another problem encountered in the current state of the art is that there are risks such as the computer not recognizing the external apparatus when external devices such as flash memory, memory card, etc. are used.

There is the breakdown possibility of the plug-in-out apparatus (cable, flash memory, memory card, etc.) during the plugging in and out thereof to and from the device such as computers, etc. to which the data will be communicated. Similarly, corresponding parts of the cameras, mobile phones, etc. to which the data will be transmitted can be damaged. Moreover, there is a high risk of experiencing data loss in the memory cards or flash memories during the wrong use of plug-in-out apparatus.

Location of the relevant memory card cannot be known to all of the users when using media tools such as cameras, mobile phones, etc. and there is as risk of loss while plugging and removing the memory card, therefore, there is a risk of data loss.

During the wireless transmissions (such as the data transfer which will be carried out only with Bluetooth) there is a risk of sending the data to a different user.

Bluetooth data sharing method used in the current state of the art can also be employed. However, this method is manual. Primarily, devices should be manually introduced to each other for communication between them. Data communication by means of this method takes longer and thus is more difficult. This is because the user must introduce the devices to each other and find the location of files on the computer.

Users may have difficulty in locating the relevant folder in the operating system if the computer doesn't automatically show the removable devices on the screen during the plugging in of these devices. For instance, let's say that a user goes to a priming centre and the employees of the centre use table-shaped computers. And the user wants the birthday photos taken at their home to be printed. In this case, the duration for the activation of the Bluetooth feature of the camera and introduction of this camera to the computer is 5 to 10 minutes for a person familiar with these operations. This situation will cause the job of the user to take longer or not preferring data import from the cameras.

In conclusion, an improvement in the relevant technical field rendered necessary due to the negative aspects mentioned above and insufficiency of the current solutions.

OBJECT OF THE INVENTION

The invention is developed by being inspired from existing conditions and seeks to solve the above mentioned drawbacks.

The object of the present invention is to enable quick wireless sharing of files or data between electronic devices that can store information and/or generate information.

Another object of the present invention is to eliminate the need for cables used in the current state of the art thanks to the wireless connection of the electronic devices with each other.

Another object of the present invention is to eliminate cable incompatibility between different models of electronic devices as cable is not required for connection.

Another object of the present invention is to prevent any deformation of the parts of removable devices as cable is not required for connection.

Another object of the present invention is to provide a means for users of all ages thanks to the easy use thereof.

Another object of the present invention is to enable even the users who do not know a foreign language sending data thanks to the simple transfer mode provide.

Another object of the present invention is to eliminate the problem of waste of time thanks to the devices quickly establishing communication with each other.

Another object of the present invention is to facilitate data communication of increasingly used electronic devices of today such as multi-touch screen (capacitive screen) computers and cameras, mobile phones, etc. with each other, making this method functional.

Another object of the present invention is to facilitate transfer of photos from the camera or address book, messages and e-mails from the mobile phone to the computer (mainframe) or another electronic device by placing the device such as camera or mobile phone on the touch surface of the multi-touch screen computer mainframe).

Another object of the present invention, in the case of multiple cameras or mobile phones, etc. that can record data being placed on the mainframe screen, is to enable the mainframe displaying the data types (photos, videos, etc.) contained within these devices right next to the device by detecting the position thereof on the screen and type of data for each device.

SUMMARY OF THE INVENTION

The present invention for fulfilling the above-described objects is a reciprocal data exchange method via touch surface, characterized in that it enables wireless data communication between two electronic devices, and it comprises the following process steps:

- turning on the first device capable of data generation and/or data storage and second device capable of data generation and/or data storage connected with a multi-touch panel; and
- disconnection of the first device from the second device after the user performs the desired data transfer,
- wherein said touch surface is characterized with the following process steps:
- sending commands triggering the second device as electrical signals through conductive frame part, by the first device (e.g. camera) is turned on;
- the first device is placed on the capacitive multi-touch surface connected with the mainframe;
- the triggering signals within the capacitive multi-touch surface is received by the mainframe through conductive frame;
- the mainframe senses a device on the capacitive multi-touch surface and determines the position of the first device on the screen;
- the mainframe receives the signals sent by capacitive multi-touch surface and conductive frame;
- the corresponding area below the conductive frame of the mainframe, display units (image forming units) located below the multi-touch panel, blanks (image blanking units) for signal transmission;
- the mainframe sends the information containing its own identity to the camera by means of light signals through switching the units corresponding to the middle of blanked units (data transfer units) on and off, confirming that identity and location of the camera is received and it is ready to receive data;
- the camera converts the light signals sent from the mainframe display units into data by means of photo sensor thereof and identifies that it is recognized by the mainframe and the mainframe is ready to receive the identity and data thereof;
- again, through these methods, data is sent, i.e. the camera sends the data through electrical signals and the mainframe sends the data through light emitted by display units and data is received on a continuous basis, i.e. the camera receives the data through photo sensor thereof and mainframe receives the data through capacitive multi-touch surface thereof.

In a preferred embodiment of the present invention, using multi-touch panel comprising a screen, data is transferred from the first storage device to the second storage device by means of negative electrical signals or data is transferred from the second storage device to the first storage device by means of light signals depending on the preference of the user.

In a preferred embodiment of the present invention, using multi-touch panel, data is transferred from the first storage device to the second storage device or from the second storage device to the first storage device by means of radio frequency signals depending on the preference of the user.

The structural and the characteristic features and all advantages of the invention will be understood more clearly with the detailed description written by referring to the following figures and therefore, the evaluation needs to be done by taking these figures and the detailed description into consideration.

DESCRIPTION OF REFERENCE NUMERALS

Figure 1:
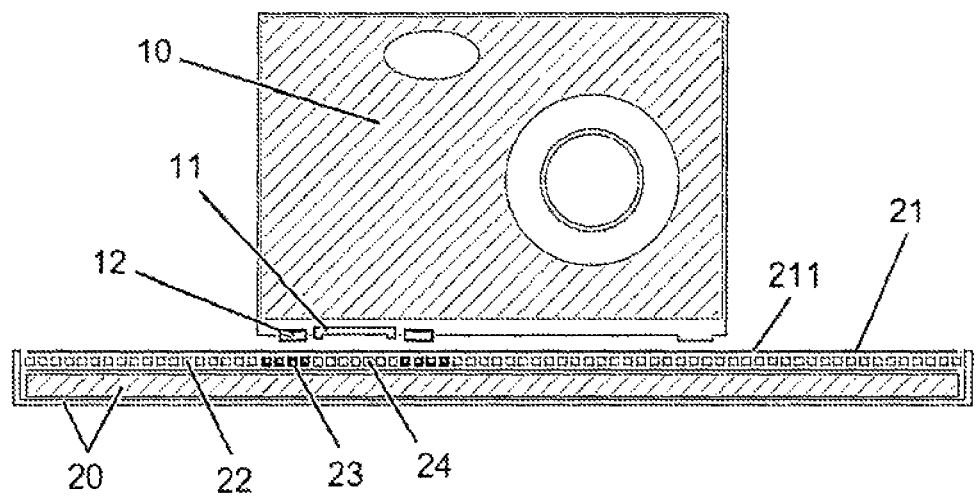
FIG. 1 is a representational view of the elements used in the data communication method via touch surface according to the invention.
Figure 2:
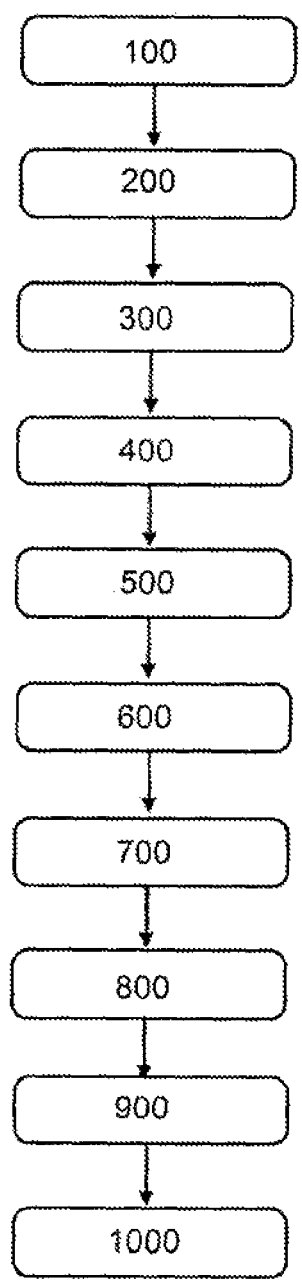
FIG. 2 is a flow diagram showing the process steps of the data communication method via touch surface according to the invention.

10. First device
11. Photo sensor
12. Conductive frame
20. Second device
21. Capacitive multi-touch panel
211. Capacitive multi-touch surface
22. Image forming units
23. Image blanking, units
24. Data transfer units Description of the Process Steps 100. Turning the first device (10) and the second device (20) on 200. Turning the first device (10) on for sending commands triggering the second device (20) as negative electrical signals through conductive frame part (12)

300. Placing the first device (10) on the capacitive multi-touch surface (211) connected with the second device (20)

400. Sending the signals enabling the detection of the identity and position information of the first device (10) on the multi-touch panel (21) to the second device (20) through conductive frame (12) over capacitive multi-touch surface (211)

500. Reception of the signals sent over capacitive multi-touch surface (211) through the conductive frame (12) by the second device (20)

600. Blanking of the corresponding area of the second device (20) located below the conductive frame (12), for image blanking unit (23) located below capacitive multi-touch surface (211) sending signal 700. Sending of the information from the second device (20) to the first device (10), containing the identity information of the second device (20) and the confirmation that the identity and location of the first device (10) is received and it is ready to receive data, by means of light signals through switching the data transfer units (24) corresponding to the middle of image blanking units (23) on and off 800. Identification by the first device (10) through converting the light signals emitted by the data transfer units (24) into data by means of photo sensor (11) thereof that the second device (20) recognized it and is ready to receive data 900. Transferring the data by using capacitive multi-touch panel (21) from the first device (10) to the second device (20) or from the second device (20) to the first device (10) depending on the preference of user 1000. Disconnection of the first device (10) from the second device (20) after the user performs the desired data transfer Scaling of drawings is not absolutely required and details, which are not needed for understanding the present invention, can be neglected. Furthermore, elements, which are at least substantially identical or have at least substantially identical functions, are indicated with the same number.

DETAILED DESCRIPTION OF THE INVENTION

In this detailed description, preferred process steps of the data communication via multi-touch surface according to the invention are explained only for a better understanding of the subject matter.

Data communication according to the present invention using multi-touch surface comprises the following: first storage device (10); photo sensor (11); conductive frame (12); and second storage device (20) on which multi-touch panel (21) comprising multi-touch surface (211) is provided.

Capacitive multi-touch panel (21) is provided on the second device (20) and connected electrically to the second device (20). Here the term multi refers to multi-touch panel (21) being sensitive to a plurality of electronic devices. Capacitive multi-touch panel (21) provides data input to any electronic device by means of touching operation, wherein it comprises capacitive touch surface (211) preferably allowing usage by the finger. Said panel (21) can be any other type of panel having the multi-touch feature and being sensitive to negative or positive electricity.

The image on the capacitive multi-touch panel (21) is provided by means of the image forming unit (22), image blanking unit (23) and data transfer units (24), all of which are located just below the capacitive multi-touch surface (211) and preferably composed of LEDs. Said units (22, 23, 24) are preferably LED, wherein the image on the capacitive multi-touch panel (21) can also be provided by means of a projector, led, a plasma or LCD screen.

The first device (10) and the second device (20) are characterized in that both can generate and store data and at least one of the two (10, 20) has a capacitive multi-touch surface (211). Therefore, the first device (10) and the second device (20) may also be a mouse or keyboard, as well as telephone, a tablet PC, camera or a hard disk such that at least one of the two said devices to be provided with data communication comprise capacitive multi-touch surface (211). In this detailed description operations performed will be described with the camera (10) as the first device (10) and the table-shaped computer (20) as the second device (20).

Conductive frame (12) is made of metallic material and surrounds the photo sensor (11). Conductive frame (12) is used to transmit data from the camera (10) to the table-shaped computer (20) by means of negative electricity. Photo sensor (11) is used to measure light intensity of the data transfer units (24) provided in the table-shaped computer (20).

Data communication method via multi-touch surface according to the invention takes place as follows. First, the user turns the camera (10) and the table-shaped computer (20) on by means of pressing on the on and off buttons provided thereon (100). When the first device (10) is turned on it sends signal to the conductive frame (12). Then, the user places the camera (10) on the touch panel (21) such that the conductive metal frame (12) stays on the capacitive multi-touch surface (211) of the capacitive multi-touch panel (21) (300). The camera (10) starts to send the signals, required for its introduction to the table-shaped computer (20), to the touch panel (21) through conductive frame (12) and using negative electricity (400). The computer (20) starts to receive said signals by means of the capacitive multi-touch panel (21) and acquires information comprising identity of the camera (10) and location thereof on the capacitive multi-touch surface (211) (500). Now, the information regarding the camera (10) is received by the computer (20). In this case, the computer (20) should start to communicate with the camera (10). Thus, the computer (20) blanks the corresponding area below the conductive metal frame (12) for the photo sensor (11) provided in the camera (10) by preventing light emission of the image blanking units (23) provided in the touch panel (21) (600). With this process, the computer (20) starts to send signal to the photo sensor (11) by means of the data transfer units (24) provided in the middle of the blanked area for transferring data to the camera (10) (700). These sent signals comprise information confirming that relevant information about the camera (10) is received and the computer (20) is ready to receive data. At this point, actually, the difficult and time consuming introduction process, i.e. introduction of the camera (10) to the table-shaped computer (20) is obtained. Now, at this moment, the user may choose a method for data communication between the camera (10) and the table-shaped computer (20) or proceed with the already chosen method. After the introduction process of the devices (10, 20) to each other, the user may maintain the connection between the camera (10) and the table-shaped computer (20) by means of light and electrical signals as in the introduction process or may prefer to carry out communication by means of radio frequency. In the case that the user prefers to perform the communication via radio frequency, he or she may choose communication via Bluetooth (wireless connection for short distances) or Wi-Fi (wireless connection). Then, the user can perform desired operations via multi-touch surface (211) or a button or buttons provided on the camera (10) (900), User requests such as sending photos, videos, etc., sending and receiving signal by means of light signals take place as follows: sending of the signal from the camera (10) to the table-shaped computer (20) proceed from the conductive metal frame (12) towards the capacitive multi-touch surface (211) while sending of the signal from the table-shaped computer (20) to the camera (10) proceed from the data transfer units (24) towards the photo sensor (11).

Upon completion of the data sending and receiving processes, the user performs disconnection process of the camera (10) from the computer (20) (1000). This process can be carried out by pressing the on off buttons of either the camera (10) or the table-shaped computer (20) or by removing the camera (10) from the capacitive multi-touch surface (211) (1000).

Figure 3:
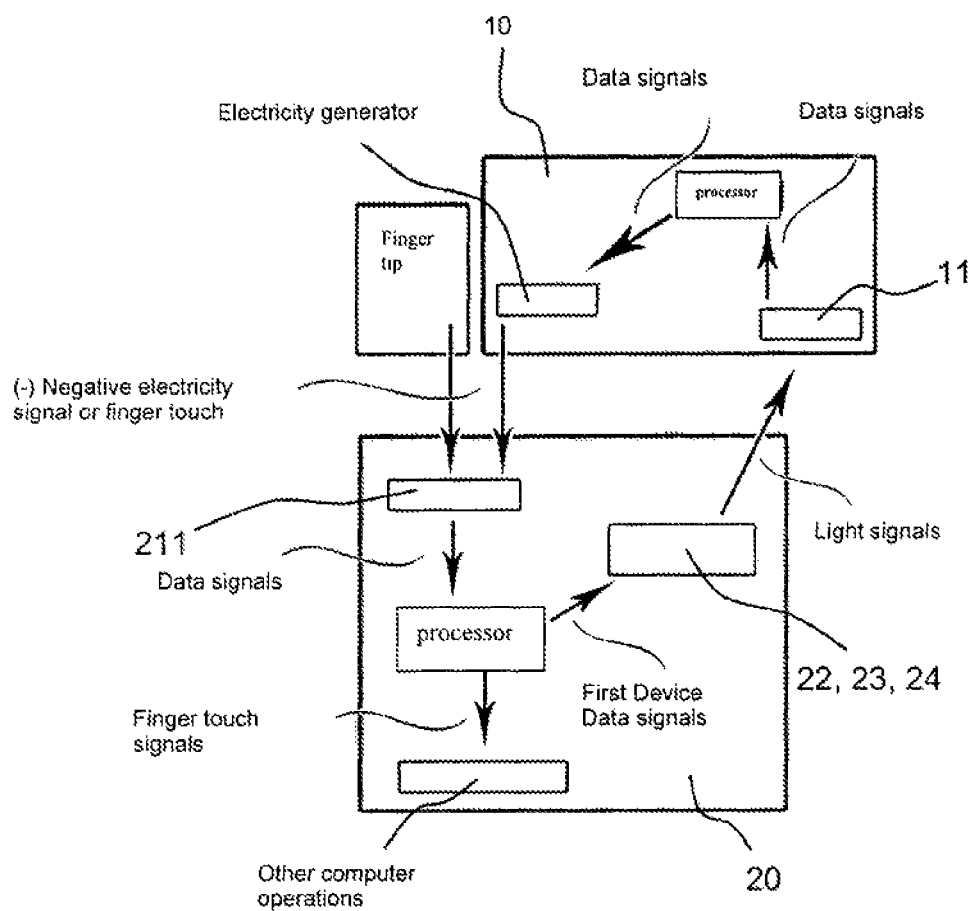
FIG. 3 is a schematic view showing the data communication between the first device and the second device of the data communication method via touch surface according to the invention.

In FIG. 3, a schematic view showing some process steps of the data communication method via touch surface according to the invention and data communication between the first device (10) and the second device (20) is given. First, the first and the second device (10, 20) are turned on. Then, energy is given to the conductive frame (12) by means of the electricity generator of the First device (10). As shown in FIG. 3, the first electronic device (10) is placed on the capacitive multi-touch surface (211). The first device (10) sends data signals to the second device (20) through the conductive frame (12) by means of negative electrical signals thanks to the capacitive feature of the capacitive multi-touch surface (211). Said data signals is processed within the processor of the second device (20) and said processor (20) generates data comprising in formation confirming that the second device (20) recognized the first device and it is ready to receive data. Data transfer units (24) send this information to the photo sensor (11) by means of light signals. Data signals received by the photo sensor (11) are sent to the processor of the first device (10). Processor receives these data signals and generates the information that it is now ready to send data. After these operations, content of the first device (10) is displayed on the capacitive multi-touch surface (211). List of data types (photo, video, etc.) contained within the first device (10) is displayed right next to the said device.

Then, the user moves their finger on the capacitive surface (211) for arranging the content displayed on the capacitive multi-touch surface (211). Capacitive surface (211) detects touching of the finger and the processor of the second device (20) performs computer operations according to the requests of the user.

The most important point in the data communication via capacitive multi-touch surface (211) is that the camera (10) is introduced to the table-shaped computer (20) in an easy manner and the data desired to be sent from the camera (10) to the table-shaped computer (20) is shown with respect to the position of the camera (10) on the table-shaped computer (20). For instance, let's say that a table-shaped computer (20) is available and 2 cameras (10) are placed on table-shaped computer (20). By this way, content for each camera (10) will be shown around thereof. This, in turn, will provide an easy way to find and manage the photos and videos contained the cameras (10) on the capacitive multi-touch surface (211).

The following example can be given for an application of the data communication method via touch surface. In the printing centres, there are table-shaped computers (20) comprising touch panels (21). The user places the camera (10) on the table-shaped computer (20). The camera (10) and the computer (20) communicate quickly with each other thanks to the data communication mentioned above. Then, the data is transferred to the table-shaped computer (20) through this method taking place by means of light signals or radio frequency signals initiated by this method.

The invention claimed is:

1. A method of data communication via a touch surface so as to enable wireless data communication between a first device and a second device, the method comprising:
   turning on the first device and the second device, the first device capable of data generation or data storage, the second device capable of data generation or data storage;
   sending commands triggering the second device as negative electrical signals through a conductive frame part when the first device is turned on;
   placing the first device on a single capacitive multi-touch surface connected to the second device;
   sending signals enabling a detection of identity information and position information of the first device on the multi-touch panel to the second device through the conductive frame over the capacitive multi-touch surface;
   receiving signals sent over the capacitive multi-touch surface through the conductive frame by the second device;
   blanking of a corresponding area of the second device located below the conductive frame;
   enabling an image blanking unit to send a signal, the image blanking unit located below the capacitive multi-touch surface;
   sending of information from the second device to the first device, the sent information containing identity information of the second device and a confirmation that the identity information and the position information of the first device is received and that the second device is ready to receive data, the step of sending of information being by means of light signals through switching data transfer units corresponding to an on and off of the image blanking unit;
   identifying by the first device through conversion of the light signals emitted by the data transfer units into data by a photosensor that the second device has recognized the first device and is ready to receive data;
   transferring the data by using the capacitive multi-touch panel from the first device to the second device or from the second device to the first device depending on the preference of a user; and
   disconnecting the first device from the second device by the user after the user has performed the data transfer.

2. The method of claim 1, said first device selected from the group consisting of a mouse, a keyboard, a phone, a tablet computer, a camera, and a hard disk.

3. The method of claim 1, said second device selected from the group consisting of a mouse, a keyboard, a phone, a tablet computer, a camera, and a hard disk.

4. The method of claim 1, the step of transferring the data comprising:
   transferring the data by using the multi-touch panel upon completion of the identification of the first and second devices to each other by radio frequency signals.

* * * * *